One 3,460,919
METHOD FOR MAKING LITHIUM
BOROHYDRIDE
Oscar F. Beumel, Jr., West Chester, William Novis Smith, Jr., Exton, and Robert F. Harris, University Park, Pa., assignors to Foote Mineral Company, Exton, Pa., a corporation of Pennsylvania
No Drawing. Filed Sept. 15, 1965, Ser. No. 487,595
Int. Cl. C01b 6/14
U.S. Cl. 23—364                                         10 Claims

ABSTRACT OF THE DISCLOSURE

An improved method for preparing lithium borohydride comprising pre-dissolving sodium borohydride in an anhydrous mixture of an alkyl amine and an ether selected from the group of diethyl ether and tetrahydrofuran followed by the addition of lithium chloride to said solution, the amount of sodium borohydride pre-dissolved in the solvent mixture being at least one-third mol thereof per mol of lithium chloride added, and, after adding any remaining sodium borohydride required to provide essentially a 1:1 mol ratio thereof to lithium chloride, and allowing the reaction to go to completion, separating the resulting solution of lithium borohydride from precipitated sodium chloride.

---

The present invention relates to a novel method for making lithium borohydride; and, more particularly, the invention relates to an improved method for manufacturing lithium borohydride by which high yields of lithium borohydride are produced in a single operation and without the limitations and disadvantages of prior procedures. In the preferred embodiment, the purity of the lithium borohydride so produced is 95% or higher.

Lithium borohydride is customarily made by reacting lithium chloride with sodium borohydride in an organic reaction medium, as described in an article by Schlesinger et al. at pages 209–213 of The Journal of the American Chemical Society, vol. 75, 1953. This procedure requires an ether extraction of the dried reaction material to obtain lithium borohydride of a purity of above 90%. The reaction is also run at rather high dilution requiring the use of large scale equipment for moderate amounts of product. These problems necessitate the use of large amounts of solvent. The initial product solution is very difficult to filter and a great deal of time is lost in this step alone. These problems combine to make the preparation of lithium borohydride difficult on a commercial scale. U.S. Patents 2,726,926, 2,829,946 and 3,113,832 represent attempts to solve the foregoing problems by using other solvents. The limitations and disadvantages of prior methods for producing lithium borohydride from lithium chloride and sodium borohydride are summarized in U.S. Patent 3,151,930. The method of this patent involves reacting the sodium borohydride and lithium chloride in a first organic liquid, such as an amine, and thereafter adding a larger amount of a second organic liquid, such as an ether or a hydrocarbon, filtering and evaporating the filtrate with the separation of the two organic liquids.

It is apparent that much research has been directed to the problems of preparing lithium borohydride.

It is the principal object of the present invention to provide a novel, improved method for the production of lithium borohydride.

It is another object of the present invention to provide a method for producing lithium borohydride from sodium borohydride and lithium chloride which represents an improvement over the prior art as exemplified above.

A further object of the present invention is to provide improved method for making lithium borohydride from sodium borohydride and lithium chloride which is simple, economical and results in high yields of lithium borohydride of a high degree of purity.

Still another object of the present invention is to provide a method for producing lithium borohydride from sodium borohydride and lithium chloride wherein the concentration of lithium borohydride in the reaction mixture is relatively high and wherein the reaction mixture is easily filtered.

Other objects will become apparent from a consideration of the following specification and the claims.

The method of the present invention comprises, in the preparation of lithium borohydride by reacting lithium chloride with sodium borohydride in an organic liquid, the improvement comprising predissolving sodium borohydride in an essentially anhydrous mixture of at least one alkyl amine containing from 3 to 4 carbon atoms and at least one ether selected from the group consisting of diethyl ether and tetrahydrofuran, said amine being present in a proportion of from about 45 to about 95%, by weight, based on the combined weight of said amine and said ether, then adding lithium chloride to said solution, the amount of sodium borohydride predissolved in said solvent mixture being at least one-third mol thereof per mol of lithium chloride added, and, after adding any remaining sodium borohydride required to provide an essentially 1:1 mol ratio thereof to lithium chloride added and the reaction is essentially complete, separating the resulting solution of lithium borohydride from precipitated sodium chloride.

It has been found that by employing the features and conditions referred to above, it is possible to obtain as the direct result of the reaction a solution of lithium borohydride which is more concentrated and at the same time more filterable, than heretofore. In addition, the filtrate contains extremely high yields of lithium borohydride. Upon simple evaporation of the mixed solvents a solid pure lithium borohydride product may be obtained. In general, the purity of the lithium borohydride will be in the neighborhood of 90% or higher, and in the preferred embodiment the purity will be about 95% or higher.

One of the important features of the present invention is the described mixed amine-ether solvent system. As stated, the amine will be at least one alkyl amine containing from 3 to 4 carbon atoms. These include the propyl and butyl amines, especially n-propyl amine, isopropyl amine, n-butyl amine and secondary butyl amine, and mixtures thereof. Isopropyl amine is the preferred amine. The ether portion of the mixed solvent will be, as stated, at least one ether selected from the group consisting of diethyl ether and tetrahydrofuran. Diethyl ether is the preferred ether. Since, as is well known, lithium borohydride reacts with active hydrogen, as in water, alcohols and the like, the amount of active hydrogen in the reaction medium should be kept as low as reasonably practical under the circumstances. Hence, the amine and ether will be essentially anhydrous so that the mixed solvent system will likewise be essentially anhydrous.

The relative proportions of the amine and ether in the mixed solvent system have been found to be important in providing the readily filterable, relatively concentrated lithium borohydride solution. Of the combined weight of the amine and ether, the amine should make up at least about 45% but should not exceed about 95%. Preferably the amine makes up at least about 50% of the mixture, with mixtures containing between about 65 and about 85%, by weight, of the amine being particularly effective.

Another important feature of the invention is having at least a substantial proportion of the sodium borohydride already in solution before adding the lithium chloride thereto. In accordance with the present invention at least one-third, and preferably at least one-half, of the total sodium borohydride will be in solution in the mixed solvent system before the lithium chloride is added thereto. Since, according to the present method, essentially equimolar quantities of sodium borohydride and lithium chloride are employed, this means that at least one-third mol, preferably at least one-half mol, of sodium borohydride is predissolved in the mixed solvent system per mol of added lithium chloride. Just that portion of the sodium borohydride which is to be predissolved may be added to the mixed solvent system and dissolved therein, and the remainder added along with the lithium chloride, or the entire amount of sodium borohydride may be added to the mixed solvent system and, after at least one-third thereof has dissolved, the lithium chloride may be added. Predissolving the sodium borohydride will present no problem since adding the sodium borohydride, in finely-divided, anhydrous form, with stirring for a few minutes is all that is required.

After the desired amount of sodium borohydride has been predissolved in the mixed solvent system, the lithium chloride is added. At this time, any remaining sodium borohydride that may be required to provide an essentially 1:1 mol ratio thereof to lithium chloride will also be added, and the reaction proceeds essentially to completion. While the lithium chloride may be added as a solution thereof in the stated mixed solvent or in one or the other of the components thereof, it is most easily added in solid form.

The reaction takes place readily at temperatures between about room temperature and the reflux temperature of the mixture. The reaction is exothermic initially, but this gradually subsides. While the reaction can go to completion without the application of external heat, it is preferred to apply heat to maintain the mixture under elevated temperature conditions, preferably at reflux, until the reaction is essentially complete.

Essential completion of the reaction can readily be determined by sampling filtered aliquot portions of the reaction mixture until the sodium and chloride ions become reduced to a minimum and are substantially equivalent.

As stated previously, the mixed solvents will be essentially anhydrous as will be the salts employed. Preferably also the atmosphere in contact with the reaction mixture will be essentially inert to the reactants and reaction products; that is to say, essentially free of moisture, oxygen and carbon dioxide. Accordingly, it is preferred to conduct the process under an essentially inert atmosphere, such as under argon, nitrogen and the like.

During the course of the reaction, sodium chloride precipitates in the reaction mixture. Upon completion of the reaction, the resulting solution of lithium borohydride is separated from the precipitated solid matter, and this may be accomplished as by filtering, centrifuging, settling and decanting, and the like. The solid lithium borohydride product can readily be recovered by evaporation of the mixed solvent system. In this process there is no need to separate the solvents and the evaporated mixed solvents can be reused as such.

By the present process it is possible to obtain concentrations of lithium borohydride directly in the reaction mixture as high as about 10%, by weight, although in most cases little advantage is gained at concentrations over about 8%. While according to one aspect of the invention, it is relatively unimportant how low the concentration of lithium borohydride is in the reaction mixture, it is preferred that it not be substantially below about 5%. The concentration of reactants, especially sodium borohydride, will, therefore, be selected to provide the desired concentration of lithium borohydride in the reaction mixture, and assuming essentially 100% conversion to lithium borohydride. The maximum concentration of lithium borohydride in the mixed solvent system at which the reaction mixture is readily handled, will depend upon the proportion of amine to ether therein. At 90% isopropyl amine-10% diethyl ether, this maximum concentration of lithium borohydride is about 10%. As the proportion of amine to ether decreases within the defined range, this maximum concentration of lithium borohydride in the resulting mixture decreases. The resulting concentration of lithium borohydride is about half that of the sodium borohydride initially employed. Thus, to provide a lithium borohydride concentration of 5 or 8%, the concentration of sodium borohydride would be about 10 or 16%, respectively and so on.

The following examples serve to illustrate the present method but are not intended to limit the scope of the invention in any way. In the examples, the sodium borohydride and lithium chloride are commercial grades, the commercial anhydrous lithium chloride containing about 0.3% water.

Example 1

After 22.5 g. of anhydrous 98% sodium borohydride are added to 250 ml. of 79%, by weight, isopropylamine and 21%, by weight, diethyl ether, the resulting slurry is refluxed under argon for 10 minutes. Upon the addition of 24.5 g. of anhydrous lithium chloride, the slurry is stirred while refluxing for 2 hours. The slurry is stirred for 1 hour more while cooling to ambient temperature, and then filtered. The solvent is removed by using vacuum and heat, and the resulting dried material weighs 12.4 g. and analyzes 98.4% as lithium borohydride.

Example 2

After 22.5 g. of anhydrous 98% sodium borohydride are added to 250 ml. of 80%, by weight, isopropylamine and 20%, by weight, diethyl ether, the resulting slurry is refluxed under argon for 10 minutes. Upon the addition of 24.4 g. of anhydrous lithium chloride, the slurry is stirred while refluxing for 2 hours. The slurry is stirred for 1 hour more while cooling to ambient temperature, and then filtered. The solvent is removed using vacuum and heat, and the resulting dried material weighs 12.6 g. and analyzes 97.6% as lithium borohydride.

Example 3

After 18.5 g. of anhydrous 98% sodium borohydride are added to 200 ml. of 90%, by weight, isopropylamine and 10%, by weight, diethyl ether, the resulting slurry is stirred under argon for 10 minutes. Upon the addition of 20.5 g. of anhydrous lithium chloride, the slurry is stirred while refluxing for 2 hours. The slurry is stirred for 0.5 hour more while cooling to ambient temperature, and then filtered. The solvent is removed using vacuum and heat, and the resulting dried material weighs 10.9 g. and analyzes 95.8% as lithium borohydride.

Example 4

After 20.2 g. of anhydrous 98% sodium borohydride are added to 238 ml. of 95%, by weight, isopropylamine and 5%, by weight, diethyl ether, the resulting slurry is stirred under argon for 10 minutes. Upon the addition of 20.8 g. of anhydrous lithium chloride, the slurry is stirred while refluxing for 2½ hours. After cooling to ambient temperature, the slurry is filtered. The filtrate is analyzed by hydrogen evolution, and an 88% yield of lithium borohydride, based on sodium borohydride, is found.

Example 5

After 14.5 g. of anhydrous 98% sodium borohydride are added to 250 ml. of 65%, by weight, isopropylamine and 35%, by weight, diethyl ether, the resulting slurry is stirred under argon for 10 minutes. Upon the addition of 17.1 g. of anhydrous lithium chloride, the slurry is stirred while refluxing for 3 hours. The slurry is stirred for 0.5 hour more while cooling to ambient temperature, and is then filtered. The solvent is removed using vacuum and heat, and the resulting dried material weighs 9.0 g. and analyzes 94.3% as lithium borohydride.

Example 6

After 5.75 g. of anhydrous 98% sodium borohydride are added to 175 ml. of 50%, by weight, isopropylamine and 50%, by weight, diethyl ether, the resulting slurry is stirred under argon for 15 minutes. Upon the addition of 6.32 g. of anhydrous lithium chloride, the slurry is stirred while refluxing for 4 hours. The slurry is stirred one hour more while cooling to ambient temperature, and is then filtered. The solvent is removed using vacuum and heat, and the resulting dried material weighs 3.22 g. and analyzes 90.8% as lithium borohydride.

Example 7

After 22.2 g. of anhydrous 98% sodium borohydride are added to 200 ml. of 82%, by weight, isopropylamine and 18%, by weight, diethyl ether, the resulting slurry is stirred under argon for 10 minutes. Upon the addition of 24.6 g. of anhydrous lithium chloride, the slurry is stirred while refluxing for 2 hours. The slurry is stirred for 0.5 hour more while cooling to ambient temperature, and is then filtered. The concentration of lithium borohydride in the solution is 9%. The solvent is removed using vacuum and heat, and the resulting dried material weighs 12.9 g., and analyzes 96.3% as lithium borohydride.

Example 8

After 24.5 g. of anhydrous 98% sodium borohydride are added to 250 ml. of 70%, by weight, sec-butylamine and 30%, by weight, diethyl ether, the resulting slurry is stirred under argon for 10 minutes. Upon the addition of 27.4 g. of anhydrous lithium chloride the slurry is stirred while refluxing for 2 hours. The slurry is stirred for 0.5 hour more while cooling to ambient temperature, and is then filtered. The solvent is removed using vacuum and heat, and the dried material weighs 13.2 g. and analyzes 96% as lithium borohydride.

Example 9

After 21.7 g. of anhydrous 98% sodium borohydride are added to 250 ml. of 65%, by weight, n-butylamine and 35%, by weight, diethyl ether, the slurry is stirred under argon for 10 minutes. Upon the addition of 24.0 g. of anhydrous lithium chloride, the slurry is stirred while refluxing for 2.5 hours. The slurry is stirred for 0.5 hour more while cooling to ambient temperature, and is then filtered. The solvent is removed by vacuum and heat, and the dried material weighs 11.6 g. and analyzes 93.4% as lithium borohydride.

Example 10

After 7.8 g. of anhydrous 98% sodium borohydride are added to 150 ml. of 74%, by weight, n-propylamine and 26%, by weight, diethyl ether, the resulting slurry is stirred under argon for 15 minutes. Upon the addition of 8.4 g. of anhydrous lithium chloride, the slurry is stirred while refluxing for 2.5 hours. The slurry is stirred for 0.5 hour more while cooling to ambient temperature and is then filtered. The solvent is removed using vacuum and heat, and the dried material weighs 4.5 g. and analyzes 90.7% as lithium borohydride.

Example 11

After 21.7 g. of anhydrous 98% sodium borohydride are added to 250 ml. of 80%, by weight, isopropylamine and 20%, by weight, tetrahydrofuran, the resulting slurry is stirred under argon for 10 minutes. Upon addition of 24.0 g. of anhydrous lithium chloride, the slurry is stirred while refluxing for 2.5 hours. The slurry is stirred 1 hour more while cooling to ambient temperature and is then filtered. The solvent is removed using vacuum and heat, and the dried material weighs 12.0 g. and analyzes 90.9% as lithium borohydride.

Modification is possible in the selection of materials and proportions thereof as well as in the particular conditions and techniques employed in the method without departing from the scope of the invention.

What is claimed is:

1. In the preparation of lithium borohydride by reacting lithium chloride with sodium borohydride in an essentially anhydrous organic liquid medium, the improvement which comprises (a) predissolving sodium borohydride in an essentially anhydrous mixture of at least one alkyl amine containing from 3 to 4 carbon atoms and at least one ether selected from the group consisting of diethyl ether and tetrahydrofuran, said amine being present in a proportion of from about 45 to about 95%, by weight, based on the combined weight of said amine and said ether, (b) then adding lithium chloride to said solution, the amount of sodium borohydride predissolved in said solvent mixture being at least one-third mol thereof per mol of lithium chloride added, and, (c) after adding any remaining sodium borohydride required to provide an essentially 1:1 mol ratio thereof to lithium chloride and the reaction is essentially complete, (d) separating the resulting solution of lithium borohydride from precipitated sodium chloride, and (e) removing said essentially anhydrous mixture of amine and ether from lithium borohydride product.

2. The method of claim 1 wherein the said amine is present in said mixture in a proportion of at least about 50%.

3. The method of claim 2 wherein the amine is present in a proportion between about 65 and about 85%.

4. The method of claim 1 wherein the amount of sodium borohydride predissolved in said solvent mixture is at least about one-half mol thereof per mol of lithium chloride added.

5. The method of claim 4 wherein substantially all of the sodium borohydride is predissolved in said solvent mixture.

6. The method of claim 1 wherein the amine is isopropylamine and wherein the ether is diethyl ether.

7. The method of claim 1 wherein the reaction is conducted at a temperature from about room temperature to refluxing.

8. The method of claim 7 wherein the reaction mixture is refluxed.

9. In the preparation of lithium borohydride by reacting lithium chloride with sodium borohydride in an essentially anhydrous organic liquid, the improvement which comprises (a) predissolving sodium borohydride in an essentially anhydrous mixture of isopropylamine and diethyl ether, said isopropylamine being present in a proportion from about 50% to about 95%, by weight, based on the combined weight of said amine and said ether, (b) then adding solid lithium chloride to said solution, the amount of sodium borohydride predissolved in said solvent mixture being at least one-half mol thereof per mol of lithium chloride added, and, (c) after adding any remaining sodium borohydride required to make an essentially 1:1 mol ratio thereof to lithium chloride and the reaction is essentially complete, (d) separating the resulting solution of lithium borohydride from precipitated sodium chloride and removing said essentially anhydrous mixture of amine and ether from lithium borohydride product.

10. The method of claim 9 wherein the isopropylamine is present in said mixture in a proportion between about 65 and about 85%, and wherein the reaction mixture is refluxed.

References Cited
UNITED STATES PATENTS 3,151,930  10/1964  Bragdon et al. _____ 23—362
3,222,120  12/1965  Del Giudice _____ 23—362 X OSCAR R. VERTIZ, Primary Examiner G. O. PETERS, Assistant Examiner U.S. Cl. X.R.

23—362